(12) United States Patent
Handa et al.

(10) Patent No.: US 7,797,709 B2
(45) Date of Patent: Sep. 14, 2010

(54) AUTOMATIC CONNECTION AND QUERY MANAGEMENT

(75) Inventors: Amit Handa, Santa Clara, CA (US); Lance J. Andersen, Santa Clara, CA (US); Binod Pankajakshy Gangadharan, Santa Clara, CA (US); Shreyas Kaushik, Santa Clara, CA (US)

(73) Assignee: Oracle America, Inc., Redwood City, CA (US)

( * ) Notice: Subject to any disclaimer, the term of this patent is extended or adjusted under 35 U.S.C. 154(b) by 986 days.

(21) Appl. No.: 11/375,895

(22) Filed: Mar. 14, 2006

(65) Prior Publication Data

US 2007/0192328 A1 Aug. 16, 2007

(30) Foreign Application Priority Data

Jan. 27, 2006 (IN) .......................... 229/DEL/2006

(51) Int. Cl.
*G06F 3/00* (2006.01)
*G06F 9/44* (2006.01)
*G06F 9/46* (2006.01)
*G06F 13/00* (2006.01)
*G06F 7/00* (2006.01)
*G06F 17/30* (2006.01)
*G06F 15/16* (2006.01)

(52) U.S. Cl. ...................... 719/328; 707/705; 709/229

(58) Field of Classification Search .................. 719/319
See application file for complete search history.

(56) References Cited

U.S. PATENT DOCUMENTS

| 2003/0084134 A1* | 5/2003 | Pace et al. ................. 709/223 |
| 2003/0154266 A1* | 8/2003 | Bobick et al. ............. 709/223 |
| 2004/0168169 A1* | 8/2004 | Ebro et al. ................. 717/172 |

OTHER PUBLICATIONS

Larry Brown, Core Web Programming Introduction to JDBC, Marty Hall, 1-24.*
DataDirect Technologies, JDBC connection Pooling, DataDirect Technologies, 1-17.*
EMMA Coverage Report, Overage Summary for Source File, 1-3.*
Graham Hamilton & Rick Cattell, JavaSoft JDBC: A Java SQL API, Jan. 10, 1997, JavaSoft Inc., pp. 1-57.*

* cited by examiner

*Primary Examiner*—Van H Nguyen
*Assistant Examiner*—Tuan Dao
(74) *Attorney, Agent, or Firm*—Martine Penilla & Gencarella, LLP

(57) ABSTRACT

A method for accessing data from a network storage medium is disclosed. An application supplies a query interface to a software object. The software object then establishes a connection between the application and the network storage medium using database information supplied by the query interface. Next, an annotated method supplied by the query interface is executed using logic provided by the software object. After the transactions have ended, the annotated method closes the connection between the application and the network storage medium.

19 Claims, 6 Drawing Sheets

AUTOMATIC CONNECTION AND QUERY MANAGEMENT

BACKGROUND

Corporations are increasingly adopting data-driven business models that use business applications which require access to a variety of different data sources within the corporation. As a result, corporate data network infrastructures have become exponentially more complex as database storage demands have also greatly increased. New data servers of all makes (e.g., Sun Microsystems Inc., IBM, Dell, etc.) and platforms (e.g., Oracle, Sybase, etc.) are routinely being integrated with existing database networks resulting in a veritable menagerie of database server makes and platforms handling the pool of enterprise data within a corporation.

Enterprise network Application Programming Interfaces (APIs), such as Sun Microsystem Inc.'s JDBC™ API, act as the glue that keeps this heterogenous mix of business applications and data servers functioning seamlessly together. Network APIs enable applications to have universal data access across an entire network irrespective of the make or platform of the data server being accessed. They eliminate the need for applications to be written specifically for each database server of a particular make or data platform on a given network thus greatly simplifying corporate database network infrastructures.

Currently, network APIs require application developers to manage the specifics (i.e., opening, maintaining, and closing the connection) of the connection to a database server and set the interface for sending query statements (i.e., Oracle Structured Query Language, Sun Query, etc.) to the server once the connection has been established. This needlessly complicates the application code and sidetracks the application developer's attention away from what should be the developer's main task, creating applications that manage the data once it's been populated with data from a database server.

In view of the forgoing, there is a need for a network API that can automatically manage connections and query statement interfaces for accessing database information from networked databases.

SUMMARY

Broadly speaking, the present invention fills these needs by providing a method and system for automatically managing connections and query statements for accessing relational data from multiple data sources. It should be appreciated that the present invention can be implemented in numerous ways, including as a system, a method and a computer program. Several inventive embodiments of the present invention are described below.

In one embodiment, a system for accessing data from a network storage medium is disclosed. The system includes a client computer system, a network storage medium and an application interface that is configured to arbitrate communications between the client computer system and the network storage medium. The client computer system contains an application having a query interface. The application interface is configured to establish a data communications connection between the application and the network storage medium using annotated methods and database information residing within the query interface. Annotated methods are used by the application interface to transact with a database stored on the network storage medium. After the application finishes transacting with the network storage medium, the application interface closes the data communications connection between the application and the network storage medium.

In another embodiment, a method for accessing data from a network storage medium is disclosed. An application supplies connection information and a query interface to a first software object. The first software object creates a second software object and passes the connection information and query interface to the second software object. Subsequently, the second software object establishes a connection between the application and the network storage medium using the connection information. An annotated method supplied by the query interfaced is then executed to enable transactions with a database stored on the network storage medium. The annotated method then closes the connection between the application and the network storage medium after the transactions are complete.

In still another embodiment, another method for accessing data from a network storage medium is disclosed. An application supplies a query interface to a software object. The software object then establishes a connection between the application and the network storage medium using database information supplied by the query interface. Next, an annotated method supplied by the query interface is executed using logic provided by the software object. After the transactions have ended, the annotated method closes the connection between the application and the network storage medium.

BRIEF DESCRIPTION OF THE DRAWINGS

The present invention will be readily understood by the following detailed description in conjunction with the accompanying drawings, and like reference numerals designate like structural elements.

DETAILED DESCRIPTION

An invention is described for methods and systems for automatic management of connections and query statements for accessing relational data from multiple database sources. It will be obvious, however, to one skilled in the art, that the present invention may be practiced without some or all of these specific details. In other instances, well known process operations have not been described in detail in order not to unnecessarily obscure the present invention.

As used herein, a database network system is any client/server network that contains one or more linked network database storage devices (i.e., database servers) configured to be accessed as a resource by one or more client machines. A network database storage device can be of any make (e.g., Sun Microsystems Inc., IBM, Dell, Compaq, Hewlett Packard, etc.) running on any database protocol (e.g., Oracle, Sybase, etc.) so long as the device can be operatively connected to a network.

The database network system can be configured into either two-tier or three-tier client/server architecture models. In the two-tier model, the application and client interface are merged together into a client application. The client application communicates directly with the network database storage devices through the use of a network API. Typically, the client application resides locally on the same client machine as the network API but separate from the network database storage devices. In the three-tiered model, the client communicates with an application that typically resides in an application server that is in communication with the network database storage devices on the database network system. In this arrangement, the network API resides on the application server, separate from both the client machine and the network database storage devices. The client interface would typically be a web browser that is in communication with the network application server via the Internet.

What is disclosed by the embodiments described herein is a network Application Programming Interface (API) for automated management of connections and query statements for accessing relational data from multiple network database storage devices on a database network system.

Figure 1:
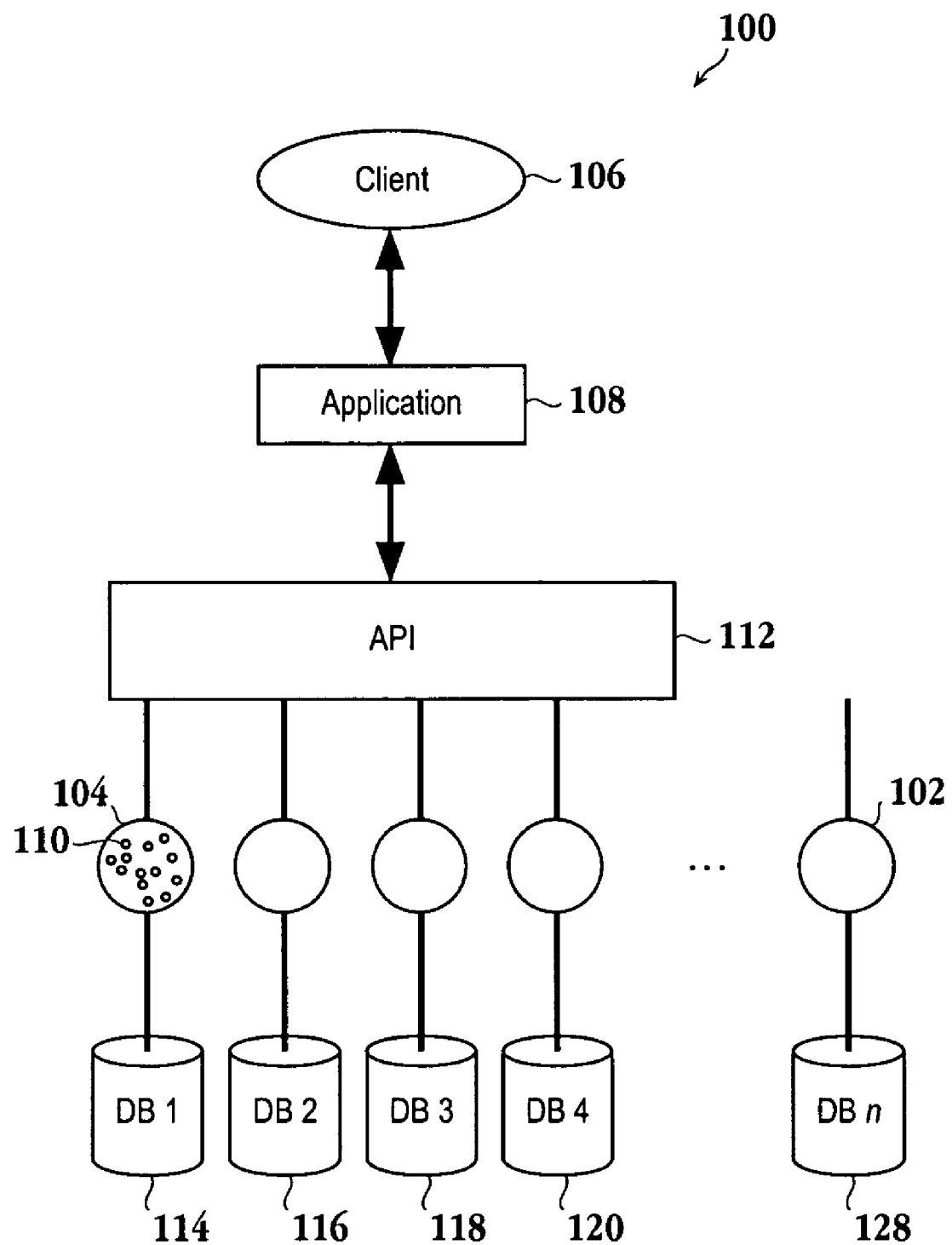
FIG. 1 is an illustration showing a system for automated management of connections and query statements for accessing relational data from multiple database sources, in accordance with one embodiment of the present invention.

FIG. 1 is an illustration showing a system for automated management of connections and query statements for accessing relational data from multiple database sources, in accordance with one embodiment of the present invention. In this exemplary embodiment, the client/server database system 100 includes a network API 112 that is configured to automatically arbitrate communications between an application 108 and multiple network database storage devices 128 on the system 100. In one embodiment, the network API 112 is a Sun Microsystems Java Database Connection (JDBC) API version 3.0. In another embodiment, the API 112 is a Sun Microsystems JDBC API version 4.0. One skilled in the art will know that any make (e.g., Microsoft Open Database Connectivity API, etc.) or version (e.g., JDBC 3.0, JDBC 4.0, etc.) of API 112 can be used with this system 100 so as long as the network API 112 can be configured to automatically manage connections (i.e., open connections, maintain connections, and close connections) and query statements between an application 108 and multiple network database storage devices 128 linked to the system 100.

The application 108 interfaces directly with the network API 112, while the network API 112 communicates with the network database storage devices 128 by way of connection objects 102. The interface between the application 108 and network API 112 facilitates the invoking of services (i.e., SQL queries, etc.) on the server side of the system 100 and the management of the connection details between the application 108 and network database storage devices 128. In one embodiment, the application 108 is a Java™ application or applet running in conjunction with a Java Virtual Machine™ on top of the existing operating system of a client machine. However, it should be understood that the application 108 could be written in any programming language (e.g., C, C++, Perl, etc.) so long as the application 108 can be configured to communicate with network database storage devices 128 via the network API 112.

Each connection object 102 represents a unique physical connection between an application 108 and a network database storage device 128, wherein the network API 112 serves as the arbitrator of data transactions between the application 108 and the network database storage device 128. For example, the Sun connection object 126 is a unique physical connection between an application 108 and the Sun network database storage device 116 via the network API 112. The connection objects (e.g., Sun Connection Object 126, IBM Connection Object 124, Dell Connection Object 122, etc.) are unique because each is associated with a device driver specific to a particular make of network database storage device (e.g., Sun Database Server 116, IBM Database Server 118, Dell Database Server 120, etc.) and contains the set of query statements and results sets being transacted in the particular session. In one embodiment, the connection object 102 is automatically acquired by the network API 112 upon an application 108 requesting data from a network database storage device 128 and automatically released by the network API 112 upon cessation of the data communication session. In another embodiment, the connection object 102 is automatically acquired and released by the network API 112 on an as needed basis to update data tables in an application 108 when data in the network database storage device 128 has been modified or updated.

Still on FIG. 1, in one embodiment the application 108 is connected to a pooled network database storage device 114 through a logical connection object 110 that is one of a set of pooled connection objects in a connection object pool 104. The connection object pool 104 is essentially a set of logical connection objects 104 that are pre-created for the pooled network database storage device 114 and made available on an as needed basis to the application 108. Unlike the connection object 102 discussed above, here the actual physical connection is established between the network API 112 and the pooled network database storage device 114 via the connection object pool 104. In one embodiment, the connection object pool 104 between the network API 112 and pooled network database storage device 114 remains open indefinitely. In another embodiment, the connection object pool 104 is released after some predetermined period of time or when data transactions have not occurred for a set period of time.

When an application 108 accesses data from the pooled network database storage device 114, the application 108 obtains one of the logical connection objects 110 from the connection object pool 104 via the network API 112. For example, when data communications is transacted between an application 108 and a Sun pooled network database storage device via the network API 112, the application 108 first obtains a Sun logical connection object from the Sun connection object pool. This arrangement allows multiple applications 108 and/or clients 106 to simultaneously access data from a pooled network database storage device 114 without having to be queued or for the physical connection to the pooled network database storage device 114 to be repeatedly opened and closed.

Continuing with FIG. 1, in one embodiment the network API 112 is configured to effectuate the automatic release of the logical connection object 110 back into the connection object pool 104 upon cessation of data transactions between the application 108 and pooled network database storage device 114. This being done without any explicit or implicit instructions from the application 108 itself. In another embodiment, the network API 112 automatically reacquires a logical connection object 110 to update data tables in an application 108 when the data in a pooled network database storage device 114 has been modified or updated and automatically releases the logical connection object 110 once the update is complete.

Still with FIG. 1, in one embodiment the network API 112 automatically manages all the query statements sent to the network database storage devices 128. The application 108 being responsible for supplying only a query interface specifying the methods and annotations that describe the data desired by the application 108. No explicit instructions being provided by the application 108 regarding the management of the query statements. It should be understood that the query statements generated by the network API 112 can be in any relational database programming query language so as long as it can be processed by the targeted network database storage device 128. One example of a programming language that can be used to create a query statement is the Structured Query Language (SQL). In another embodiment, the application 108 supplies a query interface containing only methods but no annotations.

In one embodiment the client/server database system 100 is arranged in a two-tier architecture whereby the application 108 resides in the same machine (i.e., client machine) as the client 106 and network API 112 but separate from the network database storage devices 128. In another embodiment, the client/server database system 100 is arranged into a three-tier architecture wherein the application 108 resides in a dedicated applications server along with the network API 112 separate from both the client machine (containing the client 106) and the network database storage devices 128. In a three-tier system 100, the client 106 is typically some form of presentation logic for user interaction such as an Internet web browser, Graphical User Interface (GUI), or Personal Digital Assistant (PDA). It should be appreciated that the client 106 can be any type of presentation logic so as long as the client 106 can operatively interface with the application 108.

Figure 2A:
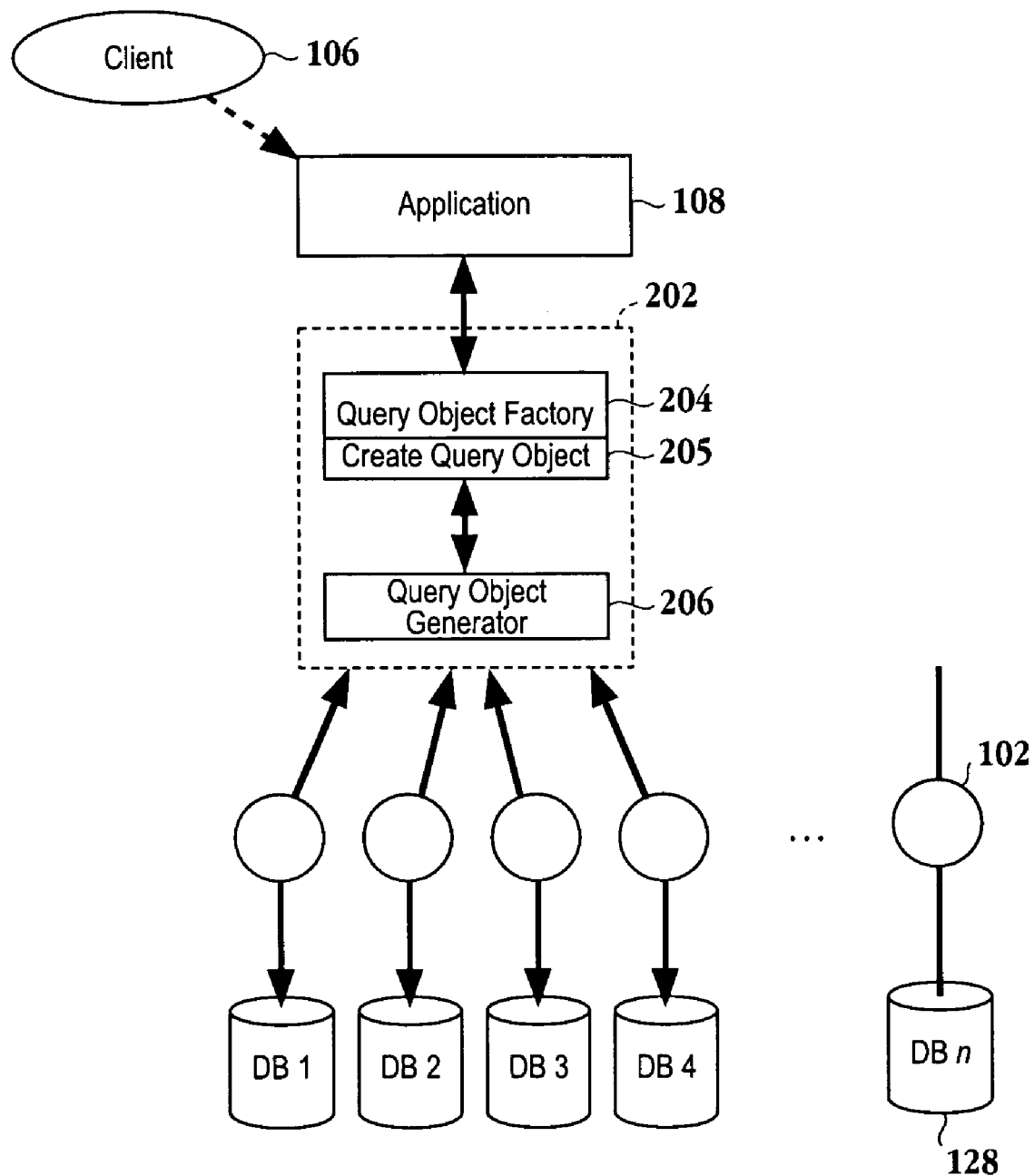
FIG. 2A depicts the functional network API elements involved in executing automatic management of connections and query statements, in accordance with one embodiment of the present invention.

FIG. 2A depicts the functional network API elements involved in executing automatic management of connections and query statements, in accordance with one embodiment of the present invention. As depicted in this embodiment, an application 108 is coupled to a network API 202 having two functionally distinct software objects, a QueryObjectFactory 204 and a QueryObjectGenerator 206. One skilled in the art will recognize that the QueryObjectFactory 204 and QueryObjectGenerator 206 object can be created using any software programming language (i.e., Java™, C, C++, Perl, etc.) so as long as they can be utilized by the network API 202 to enable automatic management of connections and query statements to network database storage devices 128. Additionally, it should be appreciated that the network API 202 can be structured to include one or more software objects so as long as the resulting network API 202 can function to automatically manage connections and query statements for accessing network database storage devices 128.

The network API 202 is configured to arbitrate all data communications transacted between the application 108 and network database storage devices 128. When transacting data with network database storage devices 128, the application 108 need only supply connection information and query interface to the QueryObjectFactory 204. The specifics of establishing the connection, sending SQL statements and processing results are all automatically managed by the network API 202.

In one embodiment, the connection information is in the form of a Universal Resource Locator (URL) that specifies the identity and location of the network database storage device 128 to the network API 202. The URL enables the network API 202 to choose an appropriate device driver for the purpose of creating a connection object 102 to establish communications with the storage device 128. In another embodiment, the connection information is a Datasource Logical Name representative of the network database storage device 128. The Datasource Logical Name is processed to create a Datasource connection object using a naming service or directory such as the Java™ Naming and Directory Interface™ (JNDI) or any other functional equivalent.

Continuing with FIG. 2A, in one embodiment when the QueryObjectFactory 204 receives connection information and query interface from the application 108, it invokes a CreateQueryObject 205 method embedded within the QueryObjectFactory 204 to create the QueryObjectGenerator 206 object. The QueryObjectGenerator 206 being responsible for establishing the connection with the network database storage device 128 that the application 108 is requesting data from and for injecting the necessary logic (i.e., SQL statements) for the query interface methods to be executed by the storage device 128. In one embodiment, the query interface includes annotated methods. The methods themselves specify the data desired by the application 108, while the annotations provide information regarding where the data is located (i.e., specific data table) within a network database storage device 128. The QueryObjectGenerator 206 processes these annotated methods into appropriate query statements that are sent to the proper network database storage device 128 for execution. In another embodiment, the query interface provides methods that do not have any annotations.

In one embodiment, the QueryObjectGenerator 206 automatically manages the connection object 102 with the desired network database storage device 128, once it receives the connection information from the QueryObjectFactory 204. This includes acquiring the connection object before the initiation of data transactions between the application 108 and the network database storage device 128 and releasing the connection object 102 once the data transactions have ceased. In one embodiment, the QueryObjectGenerator 206 is configured to monitor the connection during the entire data communications session between the application 108 and the network database storage device 128 and can detect when data communications have ceased. In one embodiment, the QueryObjectGenerator 206 can automatically reacquire the connection with the network database storage device 128 if the connection prematurely closes during a data communications session between the application 108 and the network database storage device 128. In one embodiment, the QueryObjectGenerator 206 is configured to automatically acquire and release the connection object 102 on an as needed basis to update data tables in an application 108 when data in the network database storage device 128 has been modified or updated.

It should be understood that the QueryObjectFactory 204 and QueryObjectGenerator 206 can be software object components of any network API 202 so long as they are able to operate within the logical construct of the network API 202. Examples of network APIs 202 that can utilize QueryObjectFactory 204 and QueryObjectGenerator 206 components include JDBC API version 3.0 and Microsoft's Open Database Connectivity (ODBC) API.

Figure 2B:
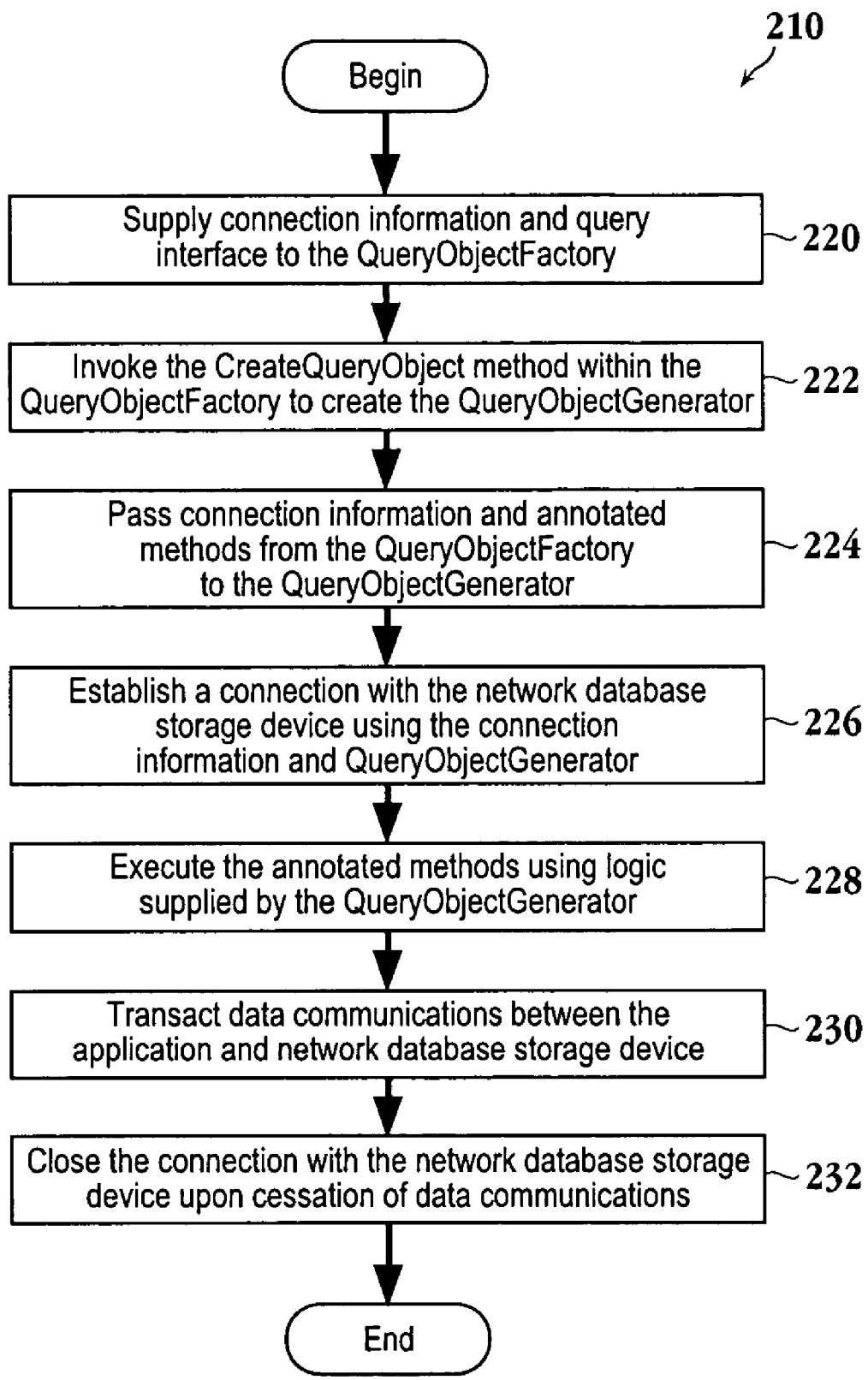
FIG. 2B shows a flow chart for automatic management of connections and query statements for accessing data from a network database storage device, in accordance on embodiment of the present invention.

FIG. 2B shows a flow chart for automatic management of connections and query statements for accessing data from a network database storage device, in accordance with one embodiment of the present invention. Diagrams of the client/server database system and network API utilized in this method are shown in FIGS. 1 and 2A. Method 210 starts with operation 220 where an application supplies connection information and a query interface to a software object that resides within the network API called the QueryObjectFactory. It should be appreciated that the connection information can be in the form of either a network database storage device URL or a Datasource Logical Name. Further, as discussed previously, the query interface can contain annotated or non-annotated methods.

The method 210 then proceeds to operation 222 where the CreateQueryObject method within the QueryObjectFactory is invoked to create a QueryObjectGenerator. Next, the method 210 moves on to operation 224 where the QueryObjectFactory passes the connection information and the methods (i.e., both annotated and non-annotated) to the QueryObjectFactory. The method 210 then goes to operation 226 whereby the network API automatically establishes a connection between the application and the network database storage device using the connection information and QueryObjectGenerator. It should be appreciated that the connection can be in the form of either a connection object with the network database storage device or a logical connection object through a connection object pool as discussed above.

Next, the method 210 proceeds to operation 228 where the methods provided by the query interface are executed using logic supplied by the QueryObjectGenerator. The logic is embedded within the code of the QueryObjectGenerator and it results in the automatic generation of query statements that are later sent to the network database storage device for processing. After executing the query interface methods, the method 210 moves on to operation 230 where the data communications between the application and network database storage device are transacted. This includes the QueryObjectGenerator sending query statements to the network database storage device and the return of data (i.e., result set, etc.) to the requesting application. Then, the method 210 proceeds to operation 232 where the QueryObjectGenerator uses its embedded logic to close the connection with the network database storage device automatically upon the cessation of data communications between the application and network database storage device.

Figure 3A:
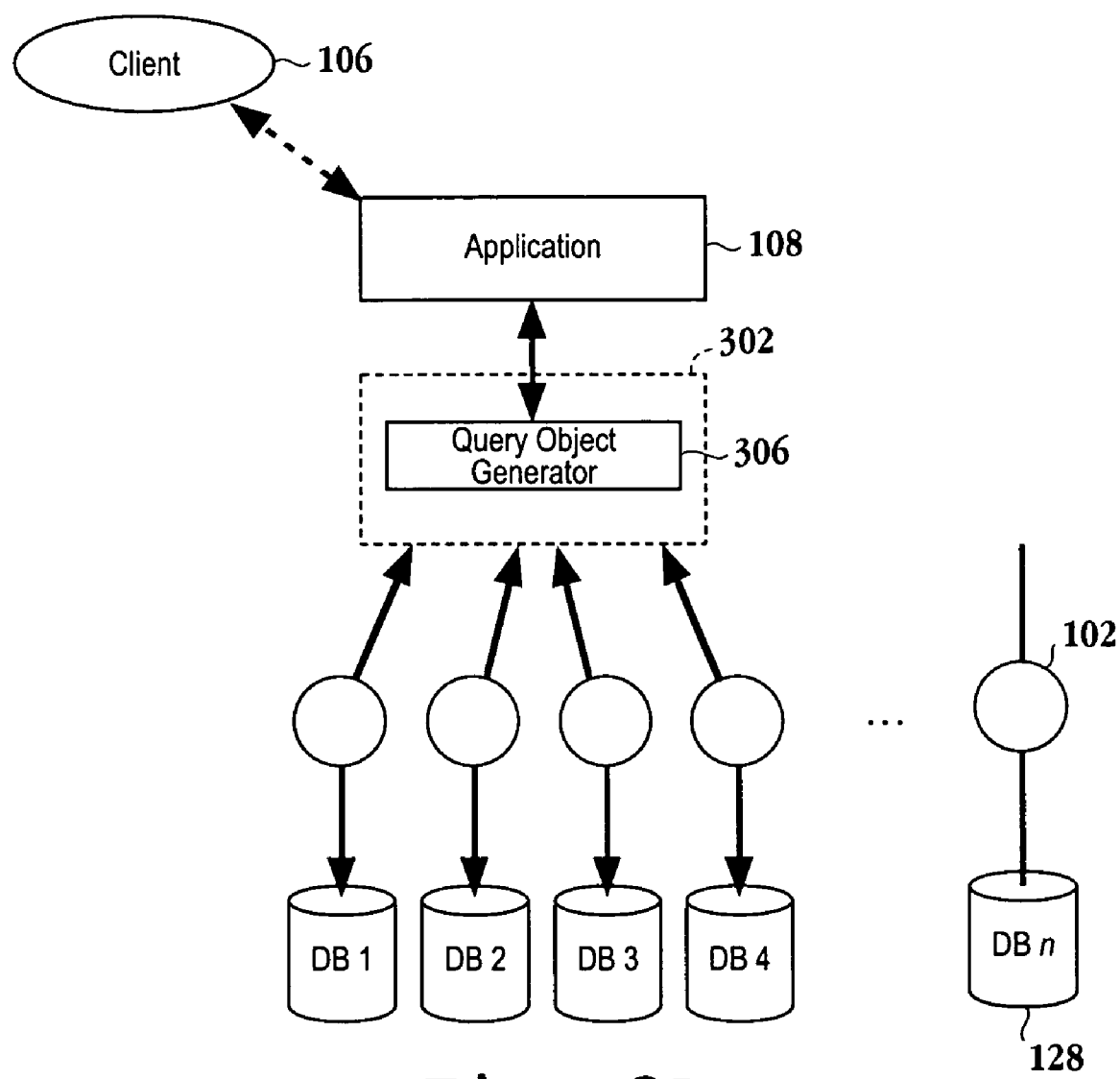
FIG. 3A depicts the functional network API elements involved in executing automatic management of connections and query statements, in accordance with one exemplary embodiment of the present invention.

FIG. 3A depicts the functional network API elements involved in executing automatic management of connections and query statements, in accordance with one exemplary embodiment of the present invention. In this exemplary embodiment, an application 108 is coupled to a network API 302 that includes a single software object called a QueryObjectGenerator 306. One skilled in the art will recognize that the QueryObjectGenerator 306 object can be created using any software programming language (i.e., Java™, C, C++, Perl, etc.) so as long as it can be utilized by the network API 302 to enable automatic management of connections and query statements to network database storage devices 128.

The network API 302 is configured to arbitrate all data communications transacted between the application 108 and network database storage devices 128. When transacting data with network database storage devices 128, the application 108 need only supply a query interface to the QueryObjectGenerator 306. The specifics of establishing the connection, sending query statements and processing results are all automatically managed by the QueryObjectGenerator 306 within the network API 302.

In one embodiment when the network API 302 receives the query interface from the application 108, it invokes a CreateQueryObject method embedded within the network API 302 to create the QueryObjectGenerator 306 object. The QueryObjectGenerator 306 being responsible for establishing the connection with the network database storage device 128 that the application 108 is requesting data from and for injecting the necessary logic (i.e., SQL statements) for the query interface methods to be executed by the storage device 128. In one embodiment, the query interface includes annotated methods. The methods themselves specify the data desired by the application 108, while the annotations provide information regarding where the data is located (i.e., specific data table) within a network database storage device 128. The QueryObjectGenerator 306 processes these annotated methods into the appropriate query statements that are sent to the network database storage device 128 for execution. In another embodiment, the query interface provides methods that do not have any annotations.

In one embodiment, the QueryObjectGenerator 306 automatically manages the connection object 102 with the desired network database storage device 128, using the database information provided by the query interface. This includes acquiring the connection object before the initiation of data transactions between the application 108 and the network database storage device 128 and releasing the connection object 102 once the data transactions have ceased. In one embodiment, the QueryObjectGenerator 306 is configured to monitor the connection during the entire data communications session between the application 108 and the network database storage device 128 and can detect when data communications have ceased.

In one embodiment, the QueryObjectGenerator 306 can automatically reacquire the connection with the network database storage device 128 if the connection closes before the completion of the data communications session between the application 108 and the network database storage device 128. In one embodiment, the QueryObjectGenerator 306 is configured to automatically acquire and release the connection object 102 on an as needed basis to update data tables in an application 108 when data in the network database storage device 128 has been modified or updated. It should be understood that the QueryObjectGenerator 306 can be a software object component of any network API 302 so long as it is able to operate within the logical construct of the network API 302. Examples of network APIs 302 that can utilize the QueryObjectGenerator 306 component include JDBC API version 4.0 and Microsoft's Open Database Connectivity (ODBC) API.

Figure 3B:
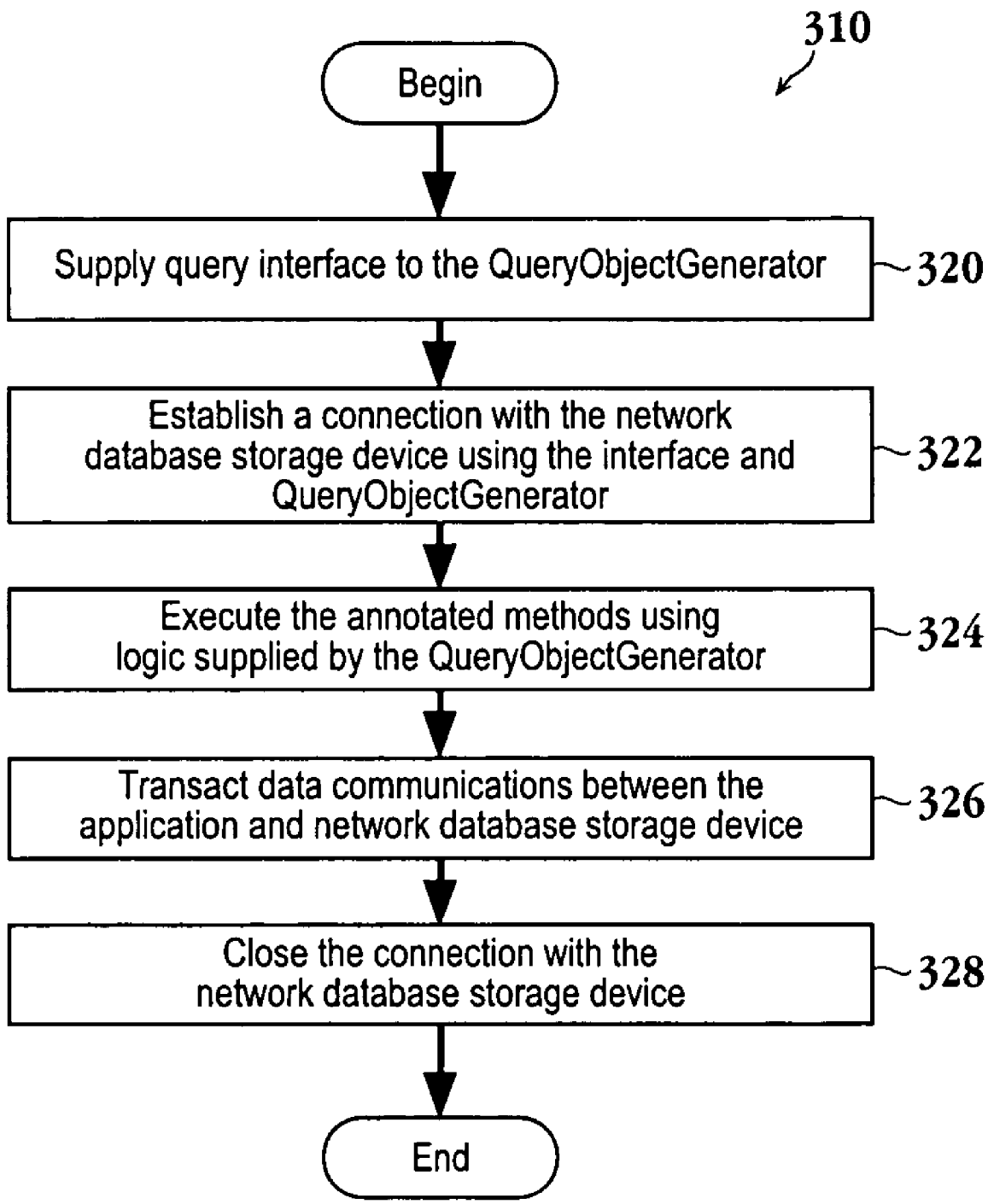
FIG. 3B shows a flow chart for automatic management of connections and query statements for accessing data from a network database storage device, in accordance on embodiment of the present invention.

FIG. 3B shows a flow chart for automatic management of connections and query statements for accessing data from a network database storage device, in accordance on embodiment of the present invention. Diagrams of the client/server database system and network API utilized in this method are shown in FIGS. 1 and 3A. Method 310 begins with operation 320 whereby an application supplies a query interface to a software object that resides within the network API called the QueryObjectGenerator. It should be appreciated that the query interface can contain both annotated and non-annotated methods.

The method 310 then proceeds to operation 322 whereby the network API automatically establishes a connection between the application and the network database storage device using the query interface and QueryObjectGenerator. It should be appreciated that the connection can be in the form of either a connection object with the network database storage device or a logical connection object through a connection object pool as discussed above. The QueryObjectGenerator being configured to utilize the database information supplied by the query interface in conjunction with a naming service or directory (i.e., Java™ Naming and Directory Interface™ (JNDI) or any other functional equivalents) to identify the network database storage device targeted by the application.

Next, the method 310 proceeds to operation 324 where the methods provided by the query interface are executed using logic supplied by the QueryObjectGenerator. The logic is embedded within the code of the QueryObjectGenerator and it results in the automatic generation of query statements that are later sent to the network database storage device for processing. After executing the query interface methods, the method 310 moves on to operation 326 where the data communications between the application and network database storage device are transacted. This includes the QueryObject-Generator sending query statements to the network database storage device and the return of data (i.e., result set, etc.) to the requesting application. Then, the method 310 proceeds to operation 328 where the QueryObjectGenerator uses its embedded logic to close the connection with the network database storage device automatically upon the cessation of data communications between the application and network database storage device.

Provided below in Table A is a sample code for the above described network API embodiments, in accordance with one embodiment of the present invention.

TABLE A

QueryTest

```
import java.sql.*;
public class QueryTest {
    Connection conn = null;
/*
 * This method sets up the environment
 */
private void doSetup( ) {
// Get a connection handle from the Database and do other
setup if needed.
}
/*
 * This method uses the QueryObjectFactory and QueryObjectGenerator
 */
private void doTest( ) {
I_QueryTest query = null;
DataSet<PersonDO> rows = null;
try {
System.out.println("Calling
QueryObjectFactory.createDefaultQueryObject( )");
    /**
     * A QueryObjectFactory is used and a connection is set to generate the
     *implementation of the method declared in the I_QueryTest
     * interface. It internally uses a QueryObjectGenerator to generate the
     * necessary logic to execute the method that is annotated with @Select
     */
        query = QueryObjectFactory.-
createDefaultQueryObject(I_QueryTest.class, conn);
        System.out.println("Got QueryObject handle ");
} catch (SQLException sqlEx) {
        System.err.println("SQLException caught "+sqlEx.getMessage( ));
}
try {
    System.out.println("Calling getAllPersons( ) : ");
    /**
     * This method gets called here on an implementation of the interface
     * generated by the QueryObjectGenerator
     */
    rows = query.getAllPersons( );
}catch (Exception ex) {
    System.out.println("Exception :"+ex.getMessage( ));
}
PersonDO p = rows.getRow( );
System.out.println("Details are: ");
System.out.println("Id: "+p.id);
System.out.println("First Name: "+p.firstName);
System.out.println("Last Name: "+p.lastName);
System.out.println("Age : "+p.age);
```

TABLE A-continued

QueryTest

```
}
public static void main(String[ ] args) {
    QueryTest qtest = new QueryTest( );
    System.out.println("Calling doSetup( ) of the Test ...");
    qtest.doSetup( );
    System.out.println("Calling doTest( ) of the Test ...");
    qtest.doTest( );
    System.out.println("Finished calling doSetup( ) of the Test ");
    }
}
/*
 * This is the interface having the annotated methods.
 * The QueryObjectGenrator injects the logic to execute this method
 */
interface I_QueryTest extends BaseQuery {
    /**
     * getAllPersons has been annotated with the annotation Select.
     */
    @Select(sql="SELECT * from query001", connected=false,
readOnly=false,tableName="query001")
DataSet<PersonDO> getAllPersons( );
```

The "query=QueryObjectFactory.createDefaultQueryObject (I_QueryTest.class, conn)" statement in the network API code instructs the QueryObjectGenerator to automatically establish a connection with a network database storage device using database information provided in the annotated methods supplied by the application. The "@Select" in the code denotes the beginning of the method annotation to the QueryObjectGenerator. As indicated before, the annotation provides information to the QueryObjectGenerator regarding where data requested by an application is located (i.e., specific data table) within a network database storage device and specifics of the connection handle. For example, the "@Select(sql="SELECT*from query001", connected=false, readOnly=false,tableName="query001")" string points the QueryObjectGenerator to data table "query001" when it executes the method "Dataset<PersonDO>getAllPersons( )" to query data for the requesting application. Additionally, the logic statement "connected=false" tells the QueryObject-Generator to automatically release the connection object once the data communications between the application and the network database storage device has ceased. It should be understood that the sample code provided above is used for illustration purposes only and should in no way be interpreted as the only way in which the code for the network API can be written. Essentially any programming language (i.e., Java™, C, C++, Perl, etc.) can be used to code the network API so as long as it results in a network API that can automatically manage connections and query statements for accessing data from a network database storage device.

Figure 4:
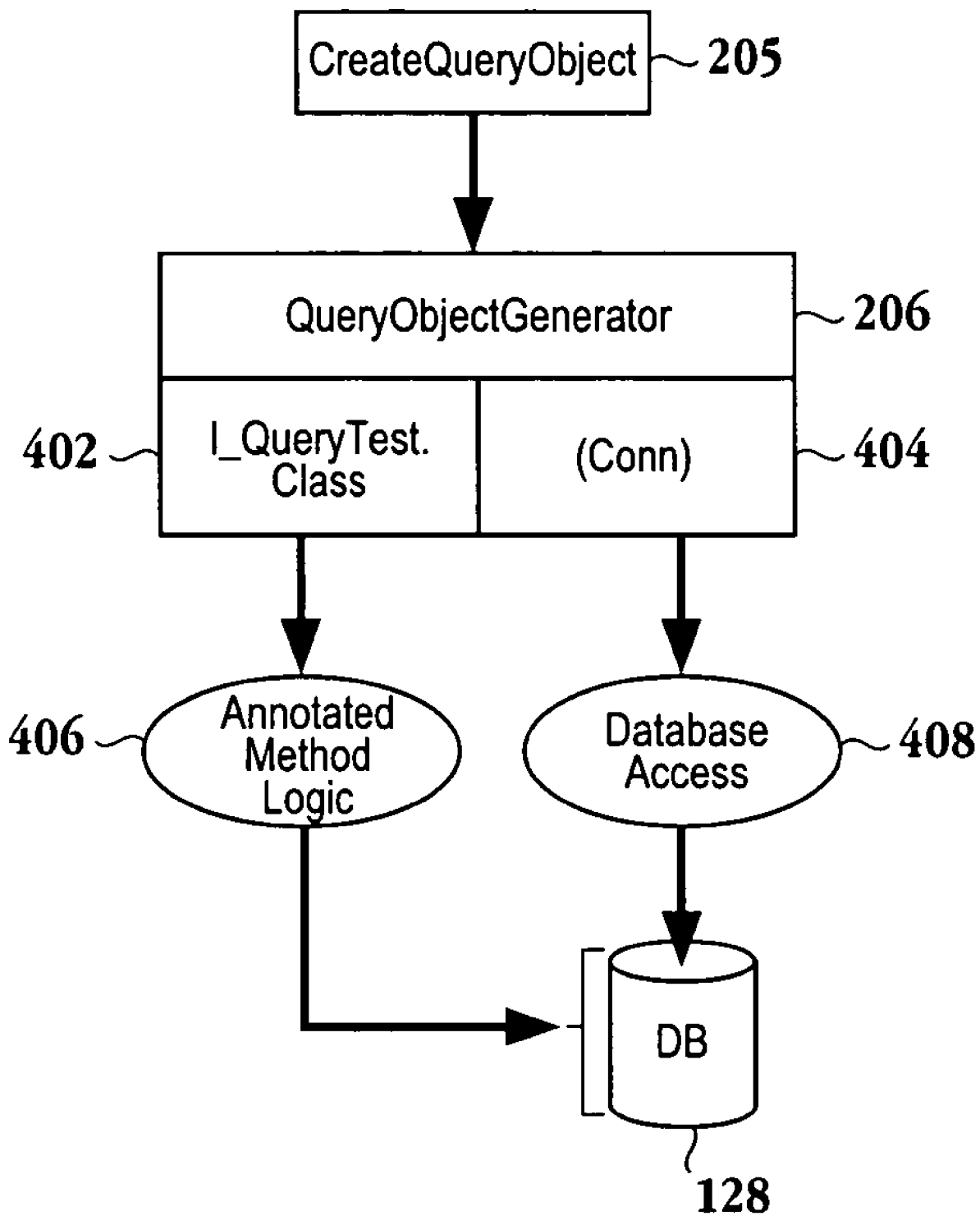
FIG. 4 is an illustration showing how a QueryObjectGenerator works to automatically manage connections and query statements, in accordance with one embodiment of the present invention.

FIG. 4 is an illustration showing how a QueryObjectGenerator works to automatically manage connections and query statements, in accordance with one embodiment of the present invention. In this exemplary embodiment, the QueryObjectGenerator 206 is depicted as being created by a call to the CreateQueryObject 205 method in the network API. The QueryObjectGenerator includes two functional elements, "I_QueryTest.class" 402 and "(conn)" 404. The "I_QueryTest.class" 402 element is responsible for providing annotated method logic 406 to allow the annotated methods to be executed on the network database storage device 128. While the "(conn)" element (i.e., query=QueryObjectFactory.createDefaultQueryObject (I_QueryTest.class, conn)) enables an application to have data access 408 to data stored on the network database storage device 128. It should be appreciated that the manner in which the network API code is structured is for illustration purposes only. The network API code can be structured to include one or more distinct software objects (i.e., QueryObjectGenerator 206) so as along as the resulting network API can effectuate the automatic management of connections and query statements for accessing network database storage devices 128.

The invention may be practiced with other computer system configurations including hand-held devices, microprocessor systems, microprocessor-based or programmable consumer electronics, minicomputers, mainframe computers and the like. The invention may also be practiced in distributing computing environments where tasks are performed by remote processing devices that are linked through a network.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, such as the carrier network discussed above, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer systems so that the computer readable code is stored and executed in a distributed fashion.

Although a few embodiments of the present invention have been described in detail herein, it should be understood, by those of ordinary skill, that the present invention may be embodied in many other specific forms without departing from the spirit or scope of the invention. Therefore, the present examples and embodiments are to be considered as illustrative and not restrictive, and the invention is not to be limited to the details provided therein, but may be modified and practiced within the scope of the appended claims.

What is claimed is:

1. A method for accessing data at a network storage medium, comprising:
   supplying connection information and a query interface to a first software object located in an Application Programming Interface (API), the connection information and the query interface being provided by an application;
   creating a second software object in the Application Programming Interface using the first software object;
   passing the connection information and query interface to the second software object;
   establishing a connection with the network storage medium within a pool of network storage media through one of a set of pooled connections, the connection to the one of the set of pooled connections being created by the second software object using the connection information, an annotated method being provided by the query interface to the second software object; and
   executing the annotated method to enable transactions with an appropriate database on the network storage medium, the annotated method processed into query statements by the second software object for execution at a specific database on the network storage medium, wherein the annotated method is configured to close the connection once the application is finished transacting with the database,
   wherein the set of pooled connections is pre-created for the pooled network storage media for each specific database and made available to the application, and wherein the connection establishes a unique communication connection between the API and the network storage medium.

2. The method for accessing data at a network storage medium, as recited in claim 1, wherein the connection information is obtained from a connection handle or a Datasource Logical Name.

3. The method for accessing data at a network storage medium, as recited in claim 2, wherein the connection handle is a Universal Resource Locator (URL).

4. The method for accessing data at a network storage medium, as recited in claim 2, wherein the Datasource Logical Name is converted into a URL using a Java™ Naming and Directory Interface™ (JNDI) naming service.

5. The method for accessing data at a network storage medium, as recited in claim 1, wherein the application is Java™ based.

6. The method for accessing data at a network storage medium, as recited in claim 1, wherein the transacting involves receiving data from the specific database on the network storage medium.

7. The method for accessing data at a network storage medium, as recited in claim 1, wherein the transacting involves updating data in the specific database on the network storage medium.

8. The method for accessing data at a network storage medium, as recited in claim 1, wherein the connection is a pooled connection.

9. The method for accessing data at a network storage medium, as recited claim 3, wherein a driver manager object uses the connection information to select a specific device driver to arbitrate communications between the application and the network storage medium.

10. The method for accessing data at a network storage medium, as recited claim 1, wherein the first software object is a QueryObjectFactory.

11. The method for accessing data at a network storage medium, as recited claim 1, wherein the second software object is a QueryObjectGenerator.

12. A system for accessing data at a network storage medium, comprising:
   a processor;
   a memory storing computer executable instructions, which when executed by the processor enables the processor to perform the steps of:
      supplying connection information and a query interface to a first software object located in an Application Programming Interface (API), the connection information and the query interface being provided by an application;

creating a second software object in the Application Programming Interface using the first software object;

passing the connection information and query interface to the second software object;

establishing a connection with the network storage medium within a pool of network storage media through one of a set of pooled connections, the connection to the one of the set of pooled connections being created by the second software object using the connection information, an annotated method being provided by the query interface to the second software object; and executing the annotated method to enable transactions with an appropriate database on the network storage medium, the annotated method processed into query statements by the second software object for execution at a specific database on the network storage medium, wherein the annotated method is configured to close the connection once the application is finished transacting with the database, wherein the set of pooled connections is pre-created for the pooled network storage media for each specific database and made available to the application, and wherein the connection establishes a unique communication connection between the API and the network storage medium.

13. The system for accessing data at a network storage medium, as recited in claim 12, wherein the application is Java™ based.

14. The system for accessing data at a network storage medium, as recited in claim 12, wherein the connection is a pooled connection.

15. The system for accessing data at a network storage medium, as recited in claim 12, wherein the transacting involves receiving data from the specific database on the network storage medium.

16. The system for accessing data at a network storage medium, as recited in claim 12, wherein the transacting involves updating data at the specific database on the network storage medium.

17. The system for accessing data at a network storage medium, as recited in claim 12, wherein a driver manager object uses connection information from the query interface to select a specific device driver to arbitrate communications between the application and the network storage medium.

18. The system for accessing data at a network storage medium, as recited in claim 12, wherein the application programming interface processes the database information to supply logic necessary to execute the annotated method.

19. A computer readable storage device having programming instructions, which when executed by a processor of a computer enables accessing data at a network storage medium, the computer readable medium comprising:

programming instructions for supplying connection information and a query interface to a first software object located in an Application Programming Interface (API), the connection information and the query interface being provided by an application;

programming instructions for creating a second software object in the Application Programming Interface using the first software object;

programming instructions for passing the connection information and query interface to the second software object;

programming instructions for establishing a connection with the network storage medium within a pool of network storage media through one of a set of pooled connections, the connection to the one of the set of pooled connections being created by the second software object using the connection information, an annotated method being provided by the query interface to the second software object; and programming instructions for executing the annotated method to enable transactions with an appropriate database on the network storage medium, the annotated method processed into query statements by the second software object for execution at a specific database on the network storage medium, wherein the annotated method is configured to close the connection once the application is finished transacting with the database, wherein the set of pooled connections is pre-created for the pooled network storage media for each specific database and made available to the application, and wherein the connection establishes a unique communication connection between the API and the network storage medium.

* * * * *